(12) United States Patent
Don et al.

(10) Patent No.: US 7,627,619 B1
(45) Date of Patent: Dec. 1, 2009

(54) DATA VERIFICATION FOLLOWING DATABASE WRITE

(75) Inventors: Arieh Don, Newton, MA (US); Philip E. Tamer, Westboro, MA (US); Alexandr Veprinsky, Brookline, MA (US); Xiali He, South Grafton, MA (US); Terry Seto Lee, Arcadia, CA (US)

(73) Assignee: EMC Corporation, Hopkinton, MA (US)

( * ) Notice: Subject to any disclaimer, the term of this patent is extended or adjusted under 35 U.S.C. 154(b) by 535 days.

(21) Appl. No.: 10/749,692

(22) Filed: Dec. 29, 2003

(51) Int. Cl.
*G06F 17/30* (2006.01)

(52) U.S. Cl. .......................... 707/205; 707/6

(58) Field of Classification Search .................. 707/10, 707/100–102, 1, 6, 9, 200, 203, 205; 710/1, 710/5; 711/100
See application file for complete search history.

(56) References Cited

U.S. PATENT DOCUMENTS

| | | | |
|---|---|---|---|
| 6,016,501 A * | 1/2000 | Martin et al. ............... | 707/203 |
| 6,070,164 A * | 5/2000 | Vagnozzi ..................... | 707/100 |
| 6,363,385 B1 * | 3/2002 | Kedem et al. ................. | 707/10 |
| 6,564,219 B1 * | 5/2003 | Lee et al. .................... | 707/100 |
| 6,772,290 B1 * | 8/2004 | Bromley et al. ............. | 711/118 |
| 6,832,229 B2 * | 12/2004 | Reed .......................... | 707/202 |
| 6,947,944 B1 * | 9/2005 | Furuike ...................... | 707/101 |
| 7,194,454 B2 * | 3/2007 | Hansen et al. ................. | 707/3 |
| 2003/0093567 A1 * | 5/2003 | Lolayekar et al. ........... | 709/246 |
| 2008/0071842 A1 * | 3/2008 | Tokuda et al. ............... | 707/202 |

* cited by examiner

*Primary Examiner*—Mohammad Ali
*Assistant Examiner*—Marc R Filipczyk
(74) *Attorney, Agent, or Firm*—Occhiuti Rohlicek & Tsao LLP (57) ABSTRACT

A method for processing a request from a host to write a database record to a target location on a logical device associated with a data-storage system in data communication with the host includes maintaining, at the data storage system, information identifying extents of the logical device that are designated for storage of database records, and, on the basis of the information, determining whether the target location is one on which a database record is permitted to be stored.

15 Claims, 5 Drawing Sheets

DATA VERIFICATION FOLLOWING DATABASE WRITE

FIELD OF INVENTION

This invention relates to data-storage systems, and in particular, to the verification of data records written to a data-storage system.

BACKGROUND

A database application executing on a host often sends a data-storage system a write request to store certain data at a target location. As part of executing the write request, the data-storage system executes certain data verification steps. Exemplary data verification tests include checksum verification, or checking to see if a particular byte or group of bytes has a particular value. These data verification steps enhance reliability by confirming the integrity of the data record. However, they also increase latency associated with executing the write request. Nevertheless, the integrity of data records is so critical to the operation of a database application that the additional latency imposed by data verification steps is routinely endured.

The particular data verification tests can depend on the target location of each write request. In addition, the particular data verification tests can vary with each database application. For example, the ORACLE™ database application requires that the second byte of a record be "2" and that the fourth through seventh bytes be non-zero. Other database applications may have different requirements for confirming the integrity of data records.

In many cases, the data-storage system also requests that ancillary data be stored by the data-storage system. This ancillary data might include, for example, temporary data created in connection with certain database operations. There is no critical need to verify the integrity of the ancillary data, as there is in the case of actual data records.

SUMMARY

The invention is based on the recognition that the overall latency of data storage operations can be reduced by distinguishing between data records and ancillary data, and by performing the time-consuming data verification steps only on the data records and not on the ancillary data.

In one aspect, the invention includes a method for processing a request from a host to write a database record to a target location on a logical device associated with a data-storage system in data communication with the host. The method includes maintaining, at the data storage system, information identifying extents of the logical device that are designated for storage of database records and, on the basis of the information, determining whether the target location is one on which a database record is permitted to be stored.

Maintaining information identifying extents can include, for example, maintaining an extent table having extent table entries identifying properties associated with the extent. These properties can include, for example, information identifying a set of data verification steps to be carried out when data is written into the extent.

Another practice of the invention includes identifying the logical device to be a logical device on which database records are to be written.

Another practice of the invention includes identifying a set of data verification steps to be carried out in connection with writing data to an extent and, optionally, carrying out the data verification steps.

In one practice of the invention, the determination of whether the target location is one on which a database record is permitted to be stored includes determining that the target location is contained completely within an extent. Or, the determination of whether the target location is one on which a database record is permitted to be stored can include determining that the target location is contained completely within one or more extents, all of which share the same data verification steps.

Another aspect of the invention is a method of processing an I/O request to access a storage device having a plurality of extents defined thereon, each of the extents having a corresponding set of processing instructions associated therewith. This includes receiving an I/O request having an associated target location on the storage device and identifying an extent set associated with the target location, the extent set having at least one extent, determining that the processing instructions associated with all of the extents within the extent set can be executed, executing the I/O transaction; and executing processing instructions consistent with the extent set associated with the target location.

Particular practices of the invention include those in which receiving an I/O request includes receiving a write request.

The processing instructions can be instructions for verifying that the writing of the data to the target location was carried out successfully.

Determining that the processing instructions associated with all of the extents within the extent set can be executed can include, as an example, determining that none of the extents associated with the target location overlap with each other. Or, it can include determining that the target location includes overlapping extents, and that the processing instructions associated with the overlapping extents are compatible.

Additional aspects of the invention include computer-readable media having encoded thereon software for causing a computer to carry out the foregoing methods.

In another aspect, the invention includes a data-storage system. A logical device associated with the data storage system has a plurality of extents defined thereon. Each of the extents has a corresponding set has associated processing instructions and information identifying each extent on the logical device and the processing instructions associated with that extent.

In one embodiment, the information identifying each extent includes an extent table having an extent table entry corresponding to an extent on the logical device.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

These and other features of the invention will be apparent from the following detailed description and the accompanying drawings, in which:

DETAILED DESCRIPTION

Figure 1:
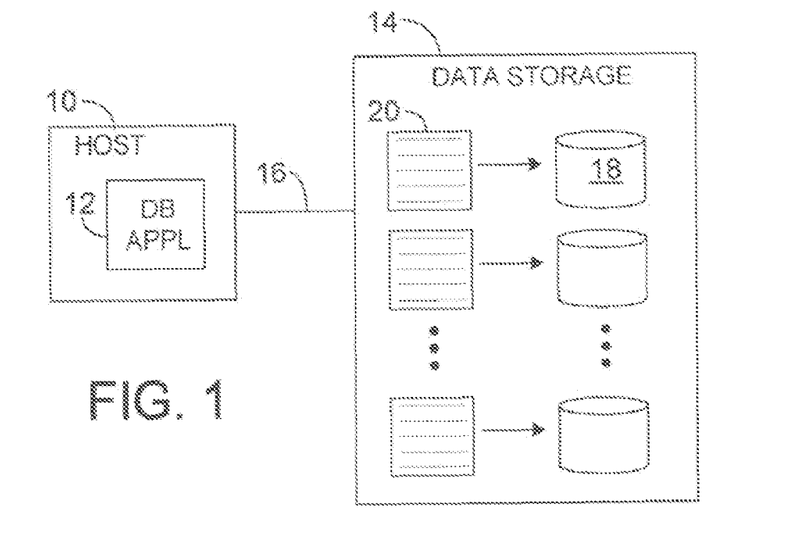
FIG. 1 shows a data storage system in data communication with a host.

Referring first to FIG. 1, a host 10 executing a database application 12 communicates with a data storage system 14 over a data communication line 16. An exemplary data storage system 14 for implementing the invention is a Symmetrix data storage system manufactured by EMC Corporation of Hopkinton, Mass.

The data storage system 14 includes physical devices (not shown) on which data is stored. These physical devices, or portions thereof, are combined to form logical devices 18, each of which has an associated extent-table 20.

Figure 2:
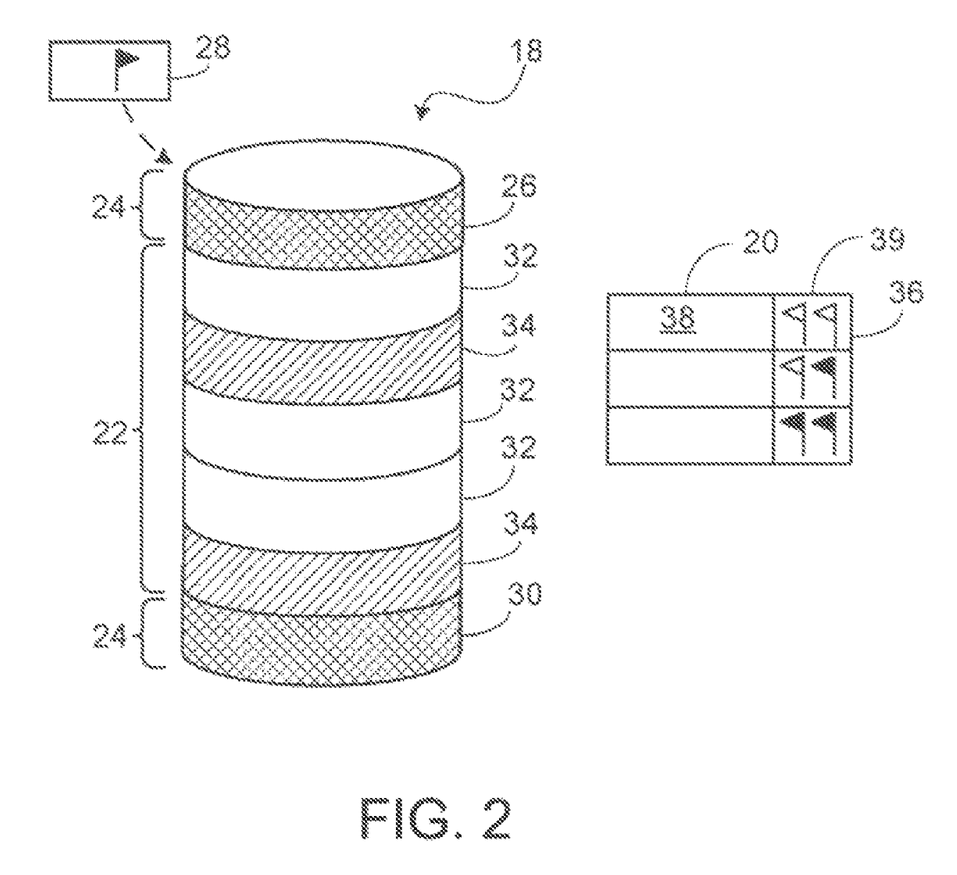
FIG. 2 shows allocation of space on a logical device.

FIG. 2 shows an exemplary logical device 18 that has been dedicated for use by a database application 12. The logical device 18 is divided into a user-data section 22, for use by the database application 12, and a non-user data section 24 for use by the data-storage system in connection with managing the logical device 18.

The non-user data section includes a primary label 26 that identifies the logical device 18. Also included in the logical device 18 is a backup label 30 to be used in case the primary label 26 becomes corrupted. A device flag 28 indicates that the logical device 18 is allocated to the database application 12. For convenience in representation, the device flag 28 is shown on the logical device 18 with which it is associated. In practice, the device flag 28 is stored in a configuration file elsewhere in the data storage system 14.

The user-data section 22 is itself divided into one or more data stores 32 for storing data records. These data stores 32 will also be referred to herein as "extents." Data written to the data store 32 is optionally subjected to selected data verification steps. The verification steps may differ from one data store 32 to another. In fact, certain data stores 32 may be defined to require no verification steps at all.

The available verification steps include inspecting a check sum for the data, as well as other verification steps unique to particular database applications. For example, certain database applications require that a particular byte of each data record have a particular value, or that a range of bytes in the data record have particular values.

The gaps between the data stores 32 include ancillary stores 34 allocated for the storage of ancillary data. This data can include, for example, data in temporary swap files, log data, and index data. Data stored in the ancillary stores 34 is not subject to the data verification steps commonly applied to data in the data stores 32 both because such steps are unnecessarily time consuming and because such data would most likely fail those tests anyway.

The data provided by the host 10 to the data storage system 14 comes as a stream of bytes. The stream of bytes is accompanied by a starting address, indicating where the first byte is to be stored, and a size, indicating how many bytes are to be stored. There is no indication of whether the data is to be stored in a data store 32 or in an ancillary store 34. To determine whether or not to carry out data verification steps, and which data verification steps to carry out, the data storage system 14 consults the extent-table 20.

The extent-table 20 contains an extent-table entry 36 corresponding to each data store 32 on its associated logical device 18. In one implementation of a logical device 18, there can be as many as 512 data stores 32. Hence, the extent-table 20 for a particular logical device 18 can have as many as 512 extent-table entries 36. Each extent-table entry 36 includes locating information 38 indicating the start address and size of an extent, and a set of verification flags 39 indicating what data verification tests, if any, are to be performed on any data written to that extent. As suggested by FIG. 2, the verification flags 39 can indicate that one or more verification steps are to be performed. For example, of the three extents shown in FIG. 2, one will undergo two verification tests, another will undergo one verification test, and the third will not undergo any verification test.

For convenience in representation, the verification flags 39 are shown in the figures by a pennant, with filled and unfilled pennants intended to represent different sets of verification flags 39. In practice, the verification flags 29 are implemented as a bit mask, with each bit in the bit mask representing a particular verification test, and the value of that bit indicating whether the verification test is to be performed.

The extent-table 20 is created as part of initializing the database application 12 for use with the data storage system 14. The host 10 then populates the extent-table 20 with extent-table entries 36, and periodically updates the extent-table 20 as necessary. The procedure carried out by the host 10 and the data storage system 14 in creating an extent-table 20 is described in U.S. Pat. No. 6,564,219, the contents of which are herein incorporated by reference.

Figure 3:
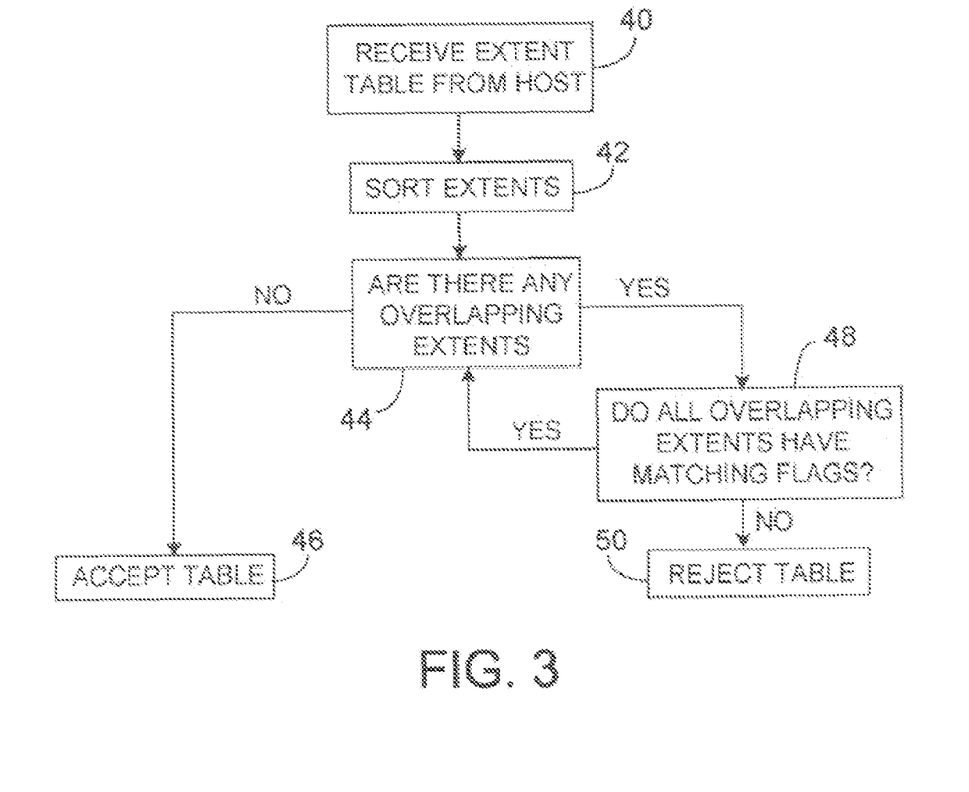
FIG. 3 is a flow chart of a method for establishing an extent-table.

FIG. 3 shows the procedure carried out by the data storage system 14 as part of the initializing or updating of the extent-table 20. The procedure begins with the receipt of proposed extent-table entries 36 provided by the host 10 (step 40). These extent-table entries 36 can be provided in any order. To enhance performance, the table entries are sorted by their start addresses and placed in the extent-table 20 in the order of their start addresses (step 42).

Figure 4:
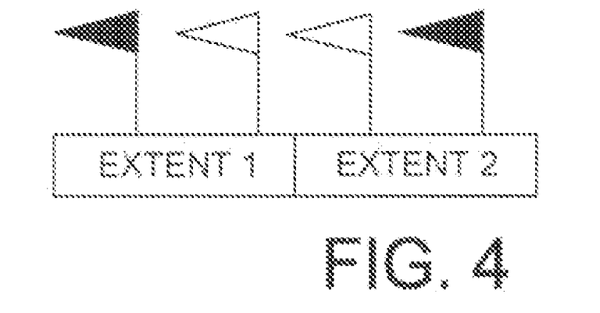
FIG. 4 is a diagram of contiguous extents with different verification flags.

The data storage system 14 then determines whether the proposed extent-table entries 36 define a proper set of extents. As a general rule, it is proper for two extent-table entries 36 to define contiguous extents, i.e. for the start address of a second extent to immediately follow the ending address of a first extent, as shown in FIG. 4.

Figure 5:
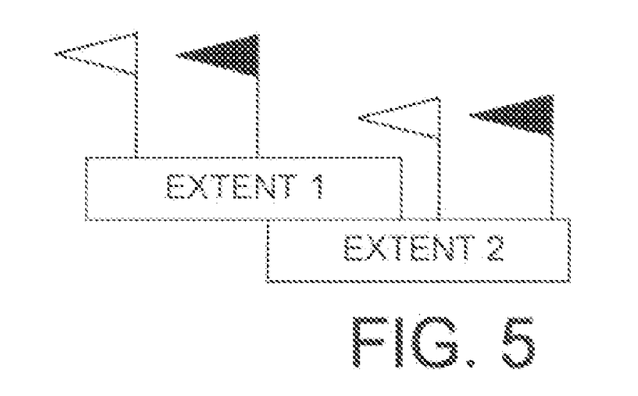
FIG. 5 is a diagram of overlapping extents with the same verification flags.
Figure 6:
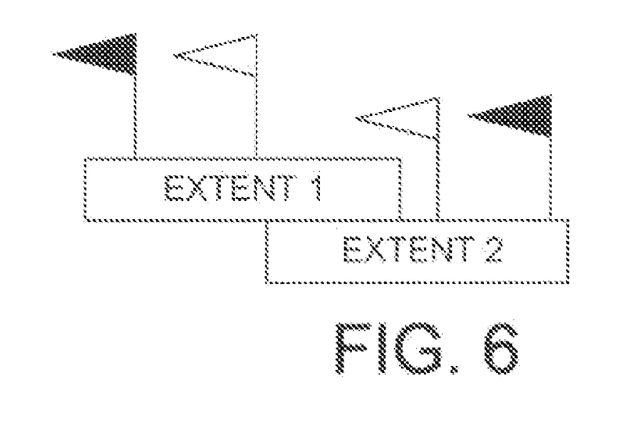
FIG. 6 is a diagram of overlapping extents with different verification flags.

It is also proper for two extent-table entries 36 to define two overlapping extents, as shown in FIG. 5, provided that those two extents have identical verification flags 39. It is, however, improper for two extent-table entries 36 to define two overlapping extents having different data verification flags as shown in FIG. 6. As used herein, a first and second extent are "overlapping" if the start address of the second extent precedes the end address of the first extent in an ordered address space. According to this definition, two identical extents are considered to be overlapping.

FIG. 6 shows an example of an improper pair of extents. These extents overlap, but they have different verification flags 39. An extent-table 20 that attempts to specify extents as shown in FIG. 7 will be rejected.

Referring back to FIG. 3, the data storage system 14 checks the proposed extent-table 20 to see if there exist any overlapping extents (step 44). If no overlapping extents are identified, the data storage system 14 accepts the proposed extent-table 20 (step 46). If, on the other hand, the data storage system 14 identifies a pair of overlapping extents, it examines the verification flags 39 of both extents (step 48). If the verification flags 39 differ, the data storage system 14 rejects the proposed extent-table 20 by returning an error message to the host 10 (step 50). If the verification flags 39 are the same, the data storage system 14 continues its search for overlapping extents (step 44).

Figure 7:
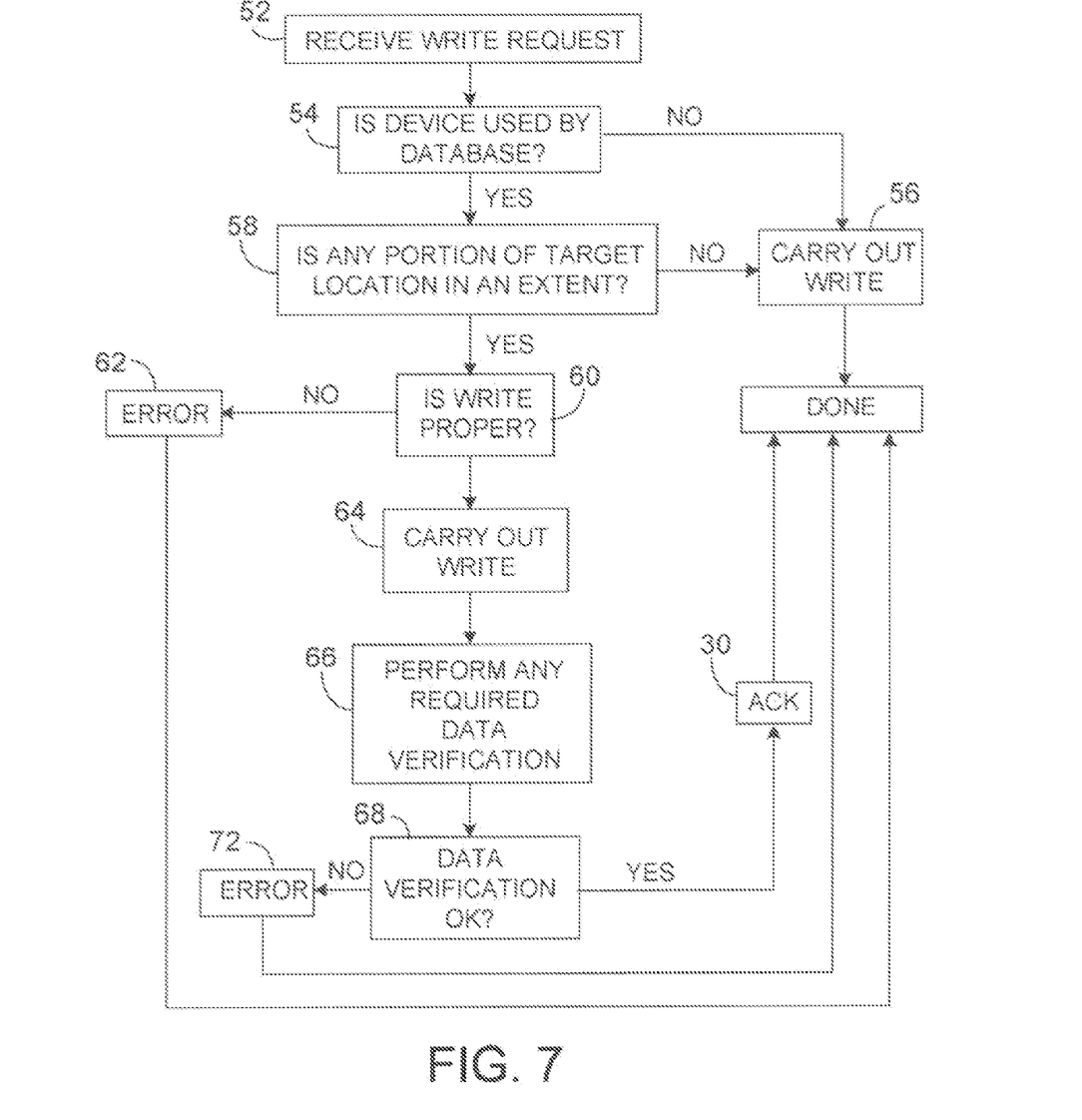
FIG. 7 is a flow chart for a method carried out by the data storage system following receipt of a write request.

Once the data storage system 14 has received the extent-table 20, it is in a position to begin accepting the host's requests to write data using the procedure summarized in FIG. 7.

Upon receiving a write request from the host 10 (step 52), the data storage system 14 inspects the device flag 28 to determine if the device to which the write is directed is device dedicated to a particular database application 12 (step 54). If it is not, the data storage system 14 carries out the write in the conventional fashion (step 56).

If, on the other hand, the data storage device determines that the logical device 18 is dedicated to the particular database application 12, it examines the extent-table 20 associated with the device to determine if the write request's target location falls within any extents specified in the extent-table 20 (step 58). If the answer is no, the data storage system 14 carries out the write in the conventional fashion (step 56). If the answer is yes, the data storage system 14 then determines if, given the constraints imposed by the extent-table 20, the write is proper (step 60).

If the target location and the configuration of the extent-table 20 are such as to render the write improper, the data storage system 14 returns an error message to the host 10 (step 62). If, on the other hand, the target location and configuration of the extent-table 20 are such that the write is permissible, then the data storage system 14 carries out the write (step 64).

If the write is deemed to be proper, the data storage system 14 writes the data to the appropriate target location (step 64) and performs whatever validation tests the verification flags 39 for that extent specify (step 66). If the recently written data passes the validation tests (step 68), the data storage system 14 returns an acknowledgment to the host 10 (step 70). Otherwise, the data storage system 14 returns an error message to the host 10 (step 72).

In one embodiment, whether or not a write request is proper (step 60) depends in part on whether its target location spans, or straddles, extents having different verification flags 39, as well as whether or not the write request spans, or straddles, both a portion of a logical device 18 that is within an extent and a portion of the logical device 18 outside any extent.

Figure 8:
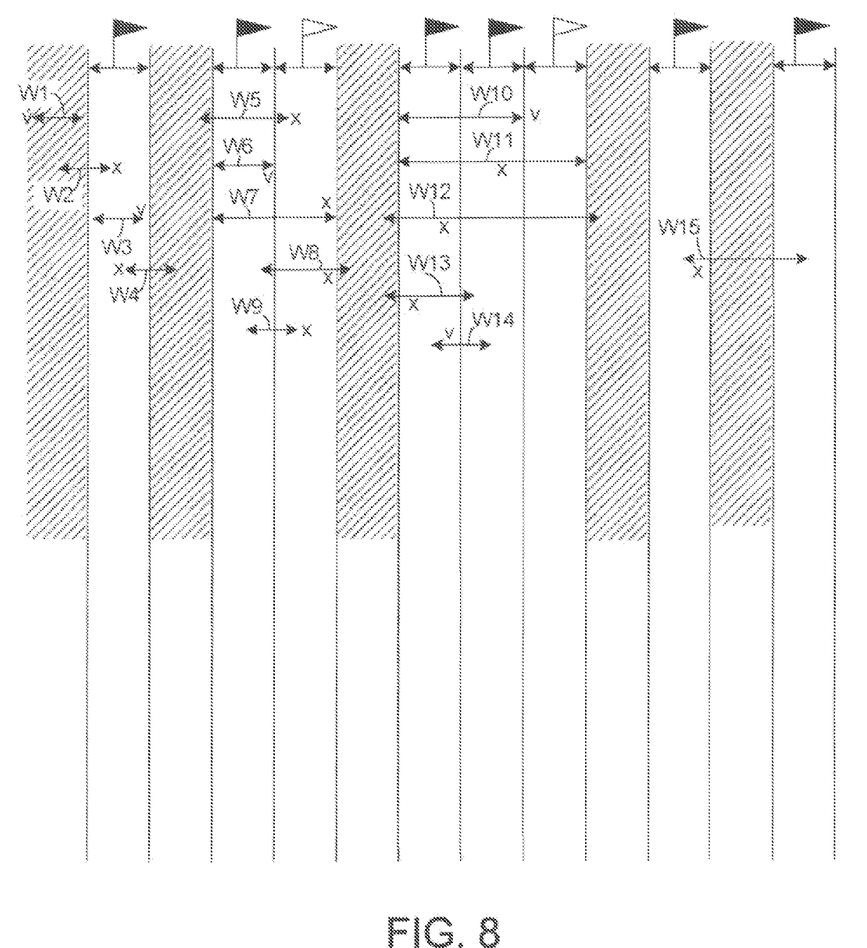
FIG. 8 is a schematic diagram of target locations associated with selected write requests overlaid on a graphical representation of extents on a logical device.

FIG. 8 is a diagram showing several target locations of several write requests overlaid on a schematic diagram of extents defined on a logical device 18. A check mark adjacent to a target location indicates that the corresponding write request is proper; an "x" indicates that it is improper. From left to right:

The first write request W1 is proper because its target location falls completely outside any extent in the extent-table 20.

The second write request W2 is improper because its target location begins outside of any extent and ends inside an extent.

The third write request W3 is proper because its target location lies completely within a single extent.

The fourth write request W4 is improper because its target location begins within an extent and ends outside any extent.

The fifth write request W5 is improper for several reasons: First, its target location begins outside any extent and ends inside an extent. Second, its target location spans extents having different verification flags.

The sixth write request W6 is proper because its target location exactly coincides with a single extent.

The seventh write request W7 is improper because its target location spans extents having different verification flags.

The eight write request W8 is improper because its target location begins in a first extent and ends outside any extent. On the way, it also passes through a second extent that has verification flags different from the verification flags of the first extent.

The ninth write request W9 is improper because its target location spans two extents having different verification flags.

The tenth write request W10 is proper because although its target location spans two extents, the two extents have the same verification flags.

The eleventh write W11 request is improper because its target location spans extents having different verification flags.

The twelfth write request W12 is improper for several reasons. Its target location starts outside any extent and includes three extents before ending outside any extent. To make matters worse, the three extents do not share the same verification flags.

The thirteenth write request W13 is improper because its target location begins outside any extent and ends inside an extent.

The fourteenth write request W14 is improper because although its target location begins and ends in extents having the same verification flags, it nevertheless includes a portion that is outside any extent.

A data storage system operating according to the invention thus avoids unnecessary data verification steps, thereby reducing the latency associated with storing data. It does so by maintaining an extent table and screening each write request to ensure its target location on the logical device is one that requires the execution of verification steps.

Although the present embodiment is described in the context of data storage, the present invention is applicable wherever there exist target-location dependent processing steps to be carried out in connection with an I/O transaction. In these applications, the specific processing steps to be carried out in connection with an I/O transaction depend on the target location associated with the I/O transaction.

As used herein, "processing steps" includes, as one special case, the absence of any further steps to be taken in connection with an I/O transaction. Thus, the invention covers the case in which some target locations require processing steps whereas certain other target locations require no further processing steps in connection with an I/O transaction. In this case, it can be said that the processing steps to be carried out in connection with an I/O transaction depend on the target location of the I/O transaction.

In the present embodiment, the gaps between defined extents are not listed on the extent table. However, it is apparent that these gaps can be considered as extents that are characterized by an absence of any associated processing steps. The absence of corresponding entries in the extent table thus saves space in the extent table. Viewed in this light, the use of "extent" in the foregoing description can extend to include extents that are not listed in the extent table.

Having described the invention, and a preferred embodiment thereof, what we claim as new, and secured by letters patent is:

1. In a data storage system that stores both database records and ancillary data, a method for processing a request from a host to write a database record to a target location on a logical device associated with a data-storage system in data communication with the host, the logical device having a first set of extents designated for storage of database records and a second set of extents designated for storage of ancillary data, the method comprising:
    maintaining, at the data storage system, an extent-table having information for distinguishing between the first set of extents and the second set of extents, each of the extents being associated with a corresponding set of processing instructions;
    based on the information, determining that the target location is on an extent that is designated for storage of a database record, and that the target location is not on an extent that is designated for storage of ancillary data, the ancillary data being different from the database record and not subject to data verification, whereby the database record is not written to an extent that is designated for storage of ancillary data; and
    writing the database record only to an extent that is designated for storage of a database record.

2. The method of claim 1, wherein the extent table has extent table entries identifying properties associated with the extent,
    wherein the properties depend at least in part on whether the extent is designated for storage of a database record and not designated for storage of ancillary data.

3. The method of claim 2, further comprising selecting the properties to include information identifying a set of data verification steps to be carried out when data is written into the extent,
    wherein the data verification steps depend on whether the extent is designated for storage of database records or for storage of ancillary data.

4. The method of claim 1, further comprising identifying the logical device to be a logical device designated for storage of database records and not a logical device designated for storage of ancillary data.

5. The method of claim 1, further comprising identifying a set of data verification steps to be carried out in connection with writing data to an extent,
    wherein the set of data verification steps depends on whether the extent is designated for storage of database records or for storage of ancillary data.

6. The method of claim 5, further comprising carrying out the data verification steps,
    wherein the data verification steps depend on whether the extent is designated for storage of database records or for storage of ancillary data.

7. The method of claim 1, wherein determining whether the target location is on an extent that is designated for storage of a database record and that the target location is not on an extent that is designated for storage of ancillary data comprises determining that the target location is contained completely within an extent, wherein a target location that is not contained completely within an extent is indicative of a target location being on an extent that is designated for storage of ancillary data.

8. The method of claim 3, wherein determining that the target location is on an extent that is designated for storage of a database record, and that the target location is not on an extent that is designated for storage of ancillary data comprises determining that the target location is contained completely within one or more extents, all of which share the same data verification steps.

9. A method of processing an Input-or-Output request to access a storage device having a plurality of extents defined thereon, each of the extents having a corresponding set of processing instructions associated therewith, the method comprising:
    receiving an Input-or-Output request having an associated target location on the storage device;
    identifying, based on an extent-table, an extent set associated with the target location, the extent set having at least a first extent and a second extent, the extent-table having information for distinguishing between the first extent and the second extent, each of the first and second extents having its own associated processing instructions in which data stored in the first extent are associated with a database record and are subject to data verification, and data stored in the second extent are associated with ancillary data and are not subject to data verification, the ancillary data being different from the database record;
    maintaining the extent-table;
    determining that execution of the processing instructions for a first extent does not preclude execution of processing instructions for the second extent;
    executing the Input-or-Output request;
    executing the processing instructions associated with the first extent; and
    executing the processing instructions associated with the second extent;
    wherein the database record is only written to an extent that is designated for storage of a database record.

10. The method of claim 9, wherein receiving an Input-or-Output request comprises receiving a write request.

11. The method of claim 10, further comprising selecting the processing instructions to include instructions for verifying that the writing of the data to the target location was carried out successfully.

12. The method of claim 9, wherein determining that execution of the processing instructions for a first extent does not preclude execution of processing instructions for the second extent comprises determining that none of the extents associated with the target location overlap with each other.

13. The method of claim 9, wherein determining that execution of the processing instructions for a first extent does not preclude execution of processing instructions for the second extent comprises determining that the first and second extents overlap, and that the processing instructions associated with the overlapping first and second extents are compatible.

14. A computer-readable medium having encoded thereon software for causing a data storage system that stores both database records and data other than database records to process a request from a host to write a database record to a target location on a logical device associated with a data-storage system in data communication with the host, the logical device having a first set of extents designated for storage of database records and a second set of extents designated for storage of ancillary data, the software comprising instructions that, when executed, cause a computer to:
    maintain, at the data storage system, an extent-table having information for distinguishing between the first set of extents and the second set of extents, each of the extents being associated with a corresponding set of processing instructions; and
    based on the information in the extent-table, determine that the target location is on an extent that is designated for storage of a database record, and that the target location is not on an extent that is designated for storage of ancillary data, the ancillary data being different from the database record and not subject to data verification, whereby the database record is written only to an extent that is designated for storage of a database record, and whereby the database record is not written to an extent that is designated for storage of ancillary data.

15. A computer-readable medium having encoded thereon software for processing an Input-or-Output request to access a storage device having a plurality of extents defined thereon, each of the extents having a corresponding set of processing instructions associated therewith, the software including instructions that, when executed, cause a computer to:

receive an Input-or-Output request having an associated target location on the storage device;

identify, based on an extent-table, an extent set associated with the target location, the extent set having at least a first extent and a second extent, the extent-table having information for distinguishing between the first extent and the second extent, each of the first and second extents having its own associated processing instructions in which data stored in the first extent associated with a database record and are subject to data verification, and data stored in the second extent are associated with ancillary data and are not subject to data verification, the ancillary data being different from the database record;

maintain the extent-table;

determine that execution of the processing instructions for a first extent does not preclude execution of processing instructions for the second extent;

execute the Input-or-Output request;

execute the processing instructions associated with the first extent; and execute the processing instructions associated with the second extent;

wherein the database record is only written to an extent that is designated for storage of a database record.

* * * * *